US010275606B2

(12) United States Patent
Kulick et al.

(10) Patent No.: US 10,275,606 B2
(45) Date of Patent: Apr. 30, 2019

(54) INDEXING AND SEARCHING DOCUMENTS WITH RESTRICTED PORTIONS

(71) Applicant: Google LLC, Mountain View, CA (US)

(72) Inventors: Matthew E. Kulick, San Francisco, CA (US); Arcot J. Preetham, Cupertino, CA (US); Manish M. Sambhu, San Francisco, CA (US); Hyduke Noshadi, Sherman Oaks, CA (US)

(73) Assignee: Google LLC, Mountain View, CA (US)

( * ) Notice: Subject to any disclaimer, the term of this patent is extended or adjusted under 35 U.S.C. 154(b) by 76 days.

(21) Appl. No.: 14/964,681

(22) Filed: Dec. 10, 2015

(65) Prior Publication Data

US 2016/0092689 A1    Mar. 31, 2016

Related U.S. Application Data

(63) Continuation of application No. 14/109,433, filed on Dec. 17, 2013, now abandoned.
(Continued)

(51) Int. Cl.
*G06F 21/62* (2013.01)
*G06F 17/30* (2006.01)
*H04L 29/06* (2006.01)

(52) U.S. Cl.
CPC ........ *G06F 21/62* (2013.01); *G06F 17/30067* (2013.01); *G06F 17/30321* (2013.01);
(Continued)

(58) Field of Classification Search
CPC .......... H04L 63/105; G06F 2221/2113; G06F 17/30321
See application file for complete search history.

(56) References Cited

U.S. PATENT DOCUMENTS

| | | | |
|---|---|---|---|
| 5,920,854 A | 7/1999 | Kirsch et al. | |
| 2004/0158527 A1* | 8/2004 | Lambert | G06F 17/30864 705/51 |

(Continued)

FOREIGN PATENT DOCUMENTS

WO      2012/058075      5/2012

OTHER PUBLICATIONS

Wikipedia, "Access Control List", http://en.wikipedia.org/wiki/access_control_list, May 11, 2013, 3 pages.
(Continued)

*Primary Examiner* — Thaddeus J Plecha
(74) *Attorney, Agent, or Firm* — Fish & Richardson P.C.

(57) ABSTRACT

One or more computer devices may receive a document from private content that is accessible by a set of users, and may extract metadata from the document. The metadata may provide information relating to one or more aspects of the document. The one or more computer devices may determine, based on the metadata, whether a portion of the document includes information that is only to be accessible by a particular user from the set of users, and may append a restrict indicator to the metadata when the portion of the document includes information that is only to be accessible by the particular user. The restrict indicator may identify the particular user and the portion of the document. The one or more computer devices may store the metadata and the restrict indicator in a personal search index.

20 Claims, 13 Drawing Sheets

Related U.S. Application Data

(60) Provisional application No. 61/823,086, filed on May 14, 2013.

(52) U.S. Cl.
CPC .... *G06F 17/30867* (2013.01); *G06F 21/6218* (2013.01); *G06F 21/6227* (2013.01); *G06F 21/6245* (2013.01); *H04L 63/10* (2013.01); *H04L 63/101* (2013.01); *H04L 63/104* (2013.01); *H04L 63/105* (2013.01); *G06F 2221/2113* (2013.01); *G06F 2221/2141* (2013.01)

(56) References Cited

U.S. PATENT DOCUMENTS

| | | | |
|---|---|---|---|
| 2006/0080316 A1 | 4/2006 | Gilmore et al. | |
| 2007/0016583 A1* | 1/2007 | Lempel | G06F 21/6227 |
| 2009/0106271 A1 | 4/2009 | Chieu et al. | |
| 2010/0063878 A1 | 3/2010 | Bachet et al. | |
| 2011/0055932 A1 | 3/2011 | Fox et al. | |
| 2011/0225139 A1* | 9/2011 | Wang | G06F 17/30867 |
| | | | 707/709 |
| 2011/0246475 A1* | 10/2011 | Shelton | G06F 21/6245 |
| | | | 707/741 |
| 2011/0265177 A1* | 10/2011 | Sokolan | G06F 21/6227 |
| | | | 726/19 |
| 2012/0117626 A1 | 5/2012 | Yates et al. | |
| 2013/0054976 A1 | 2/2013 | Brown et al. | |
| 2013/0326640 A1 | 12/2013 | Nun et al. | |
| 2014/0089816 A1 | 3/2014 | DiPersia et al. | |
| 2014/0337317 A1 | 11/2014 | Woss et al. | |
| 2018/0012034 A1* | 1/2018 | Rozenberg | G06F 21/6218 |

OTHER PUBLICATIONS

Notification of Transmittal of the International Search Report and the Written Opinion of the International Searching Authority, or the Declaration corresponding to PCT/US2014/037973, dated Sep. 4, 2014, 7 pages.

Steve's Digicams, "How to Make Tagged Facebook Photos Private," retrieved on Oct. 27, 2015, retrieved from the Internet: URL<http://www.steves-digicams.com/knowledge-center/how-tos-online-sharing-social-network/how-to-tagged-facebook-photos-private.html>, 4 pages.

International Preliminary Report on Patentability in International Application No. PCT/US2014/037973, dated Nov. 26, 2015.

* cited by examiner

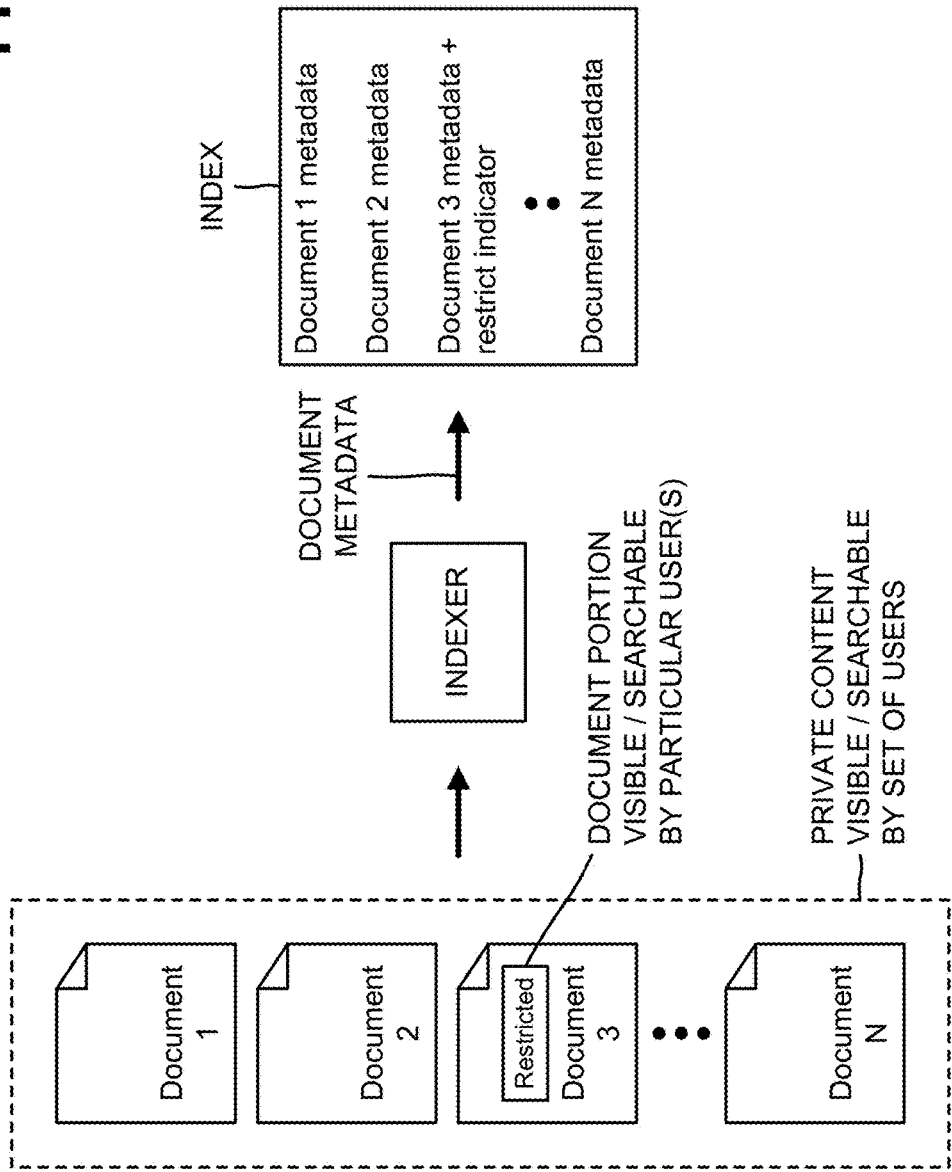

OVERVIEW

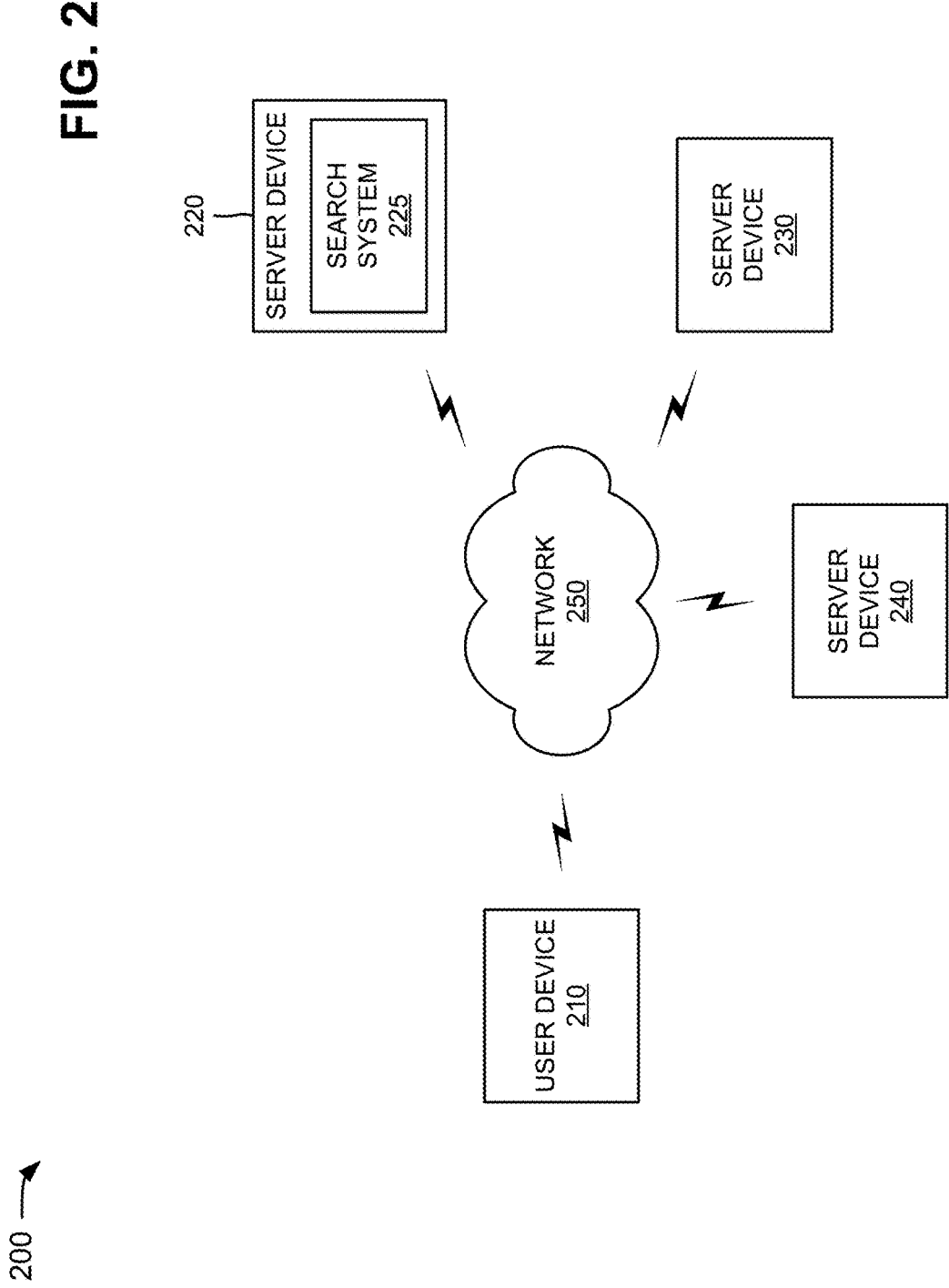

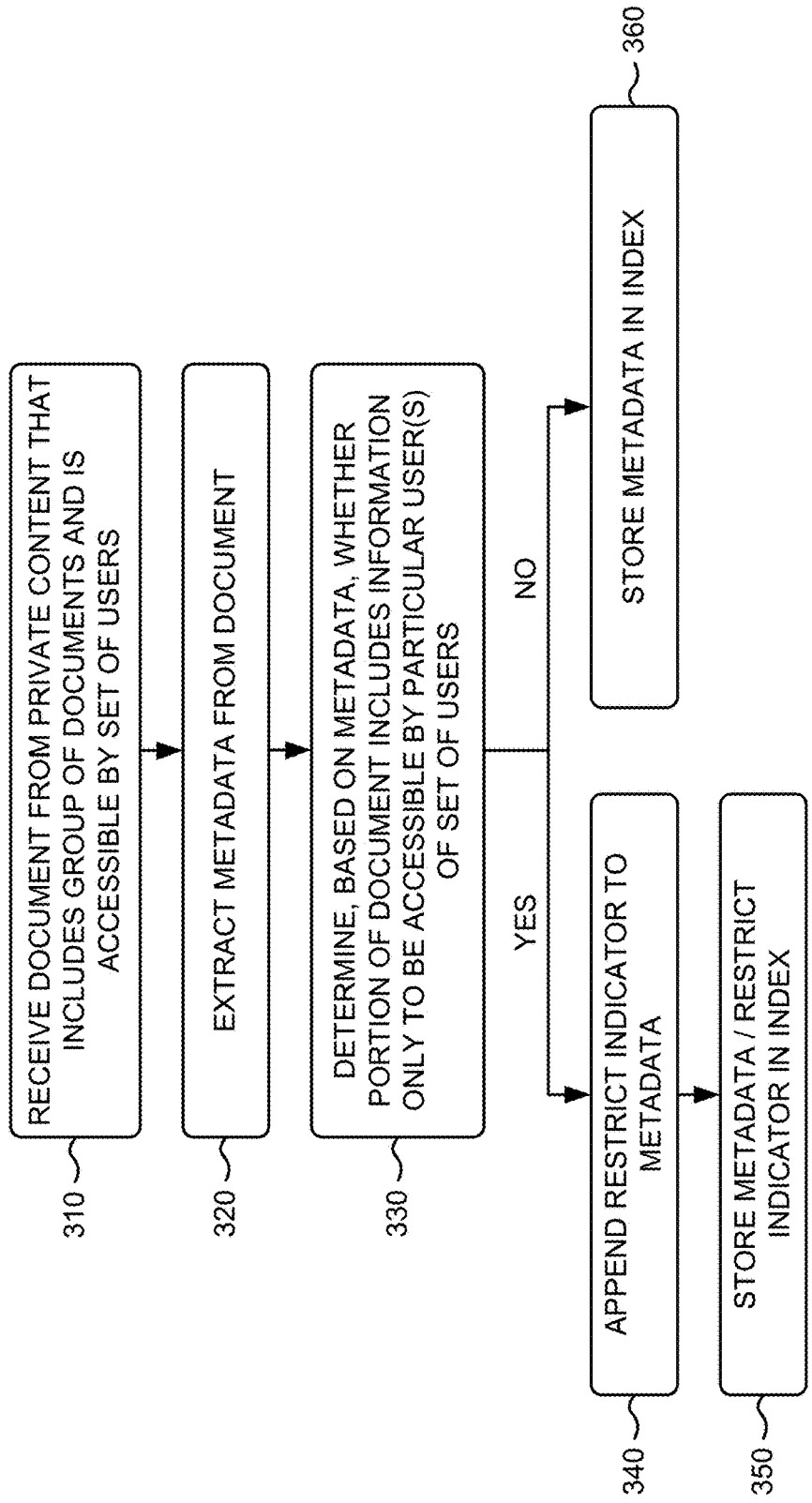

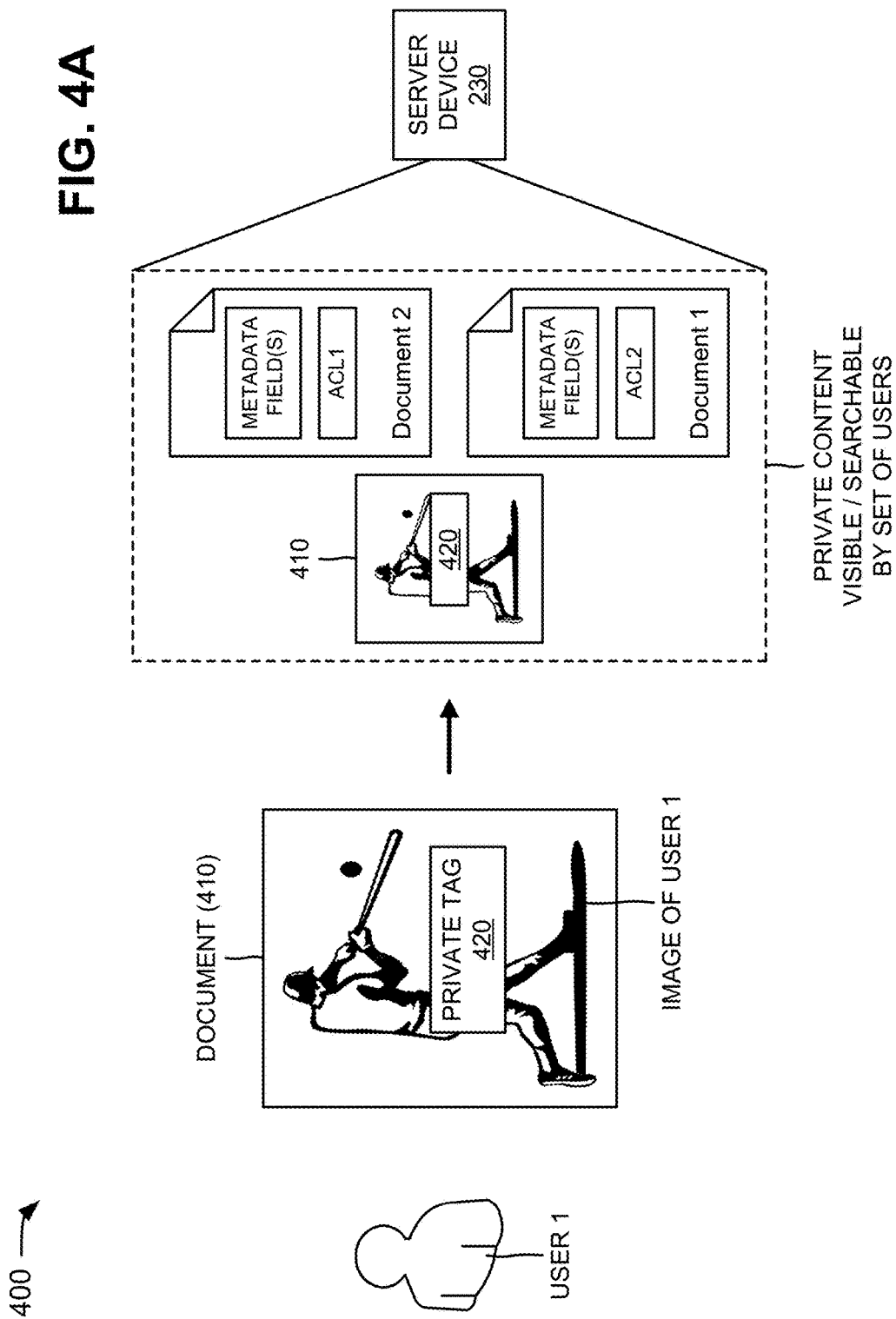

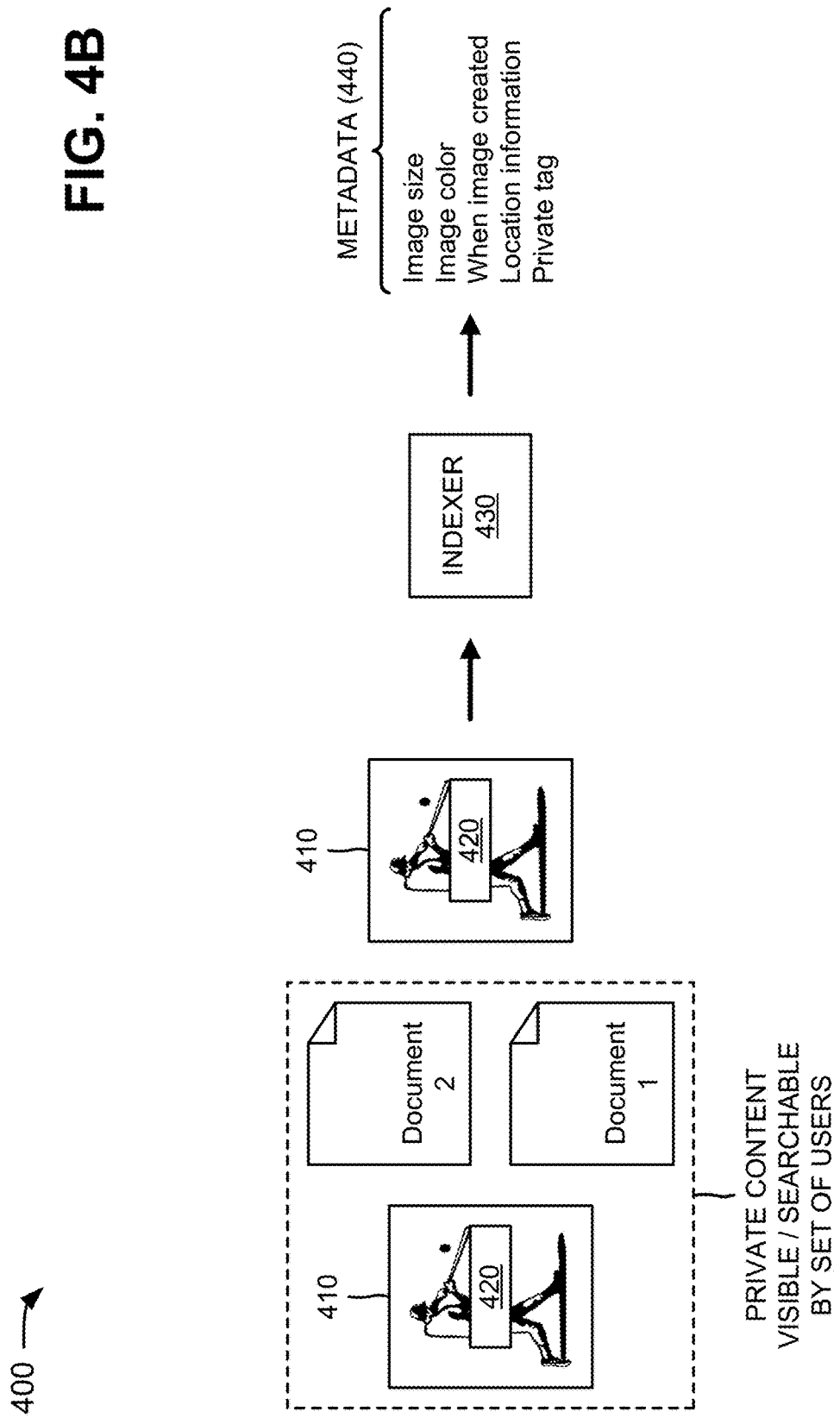

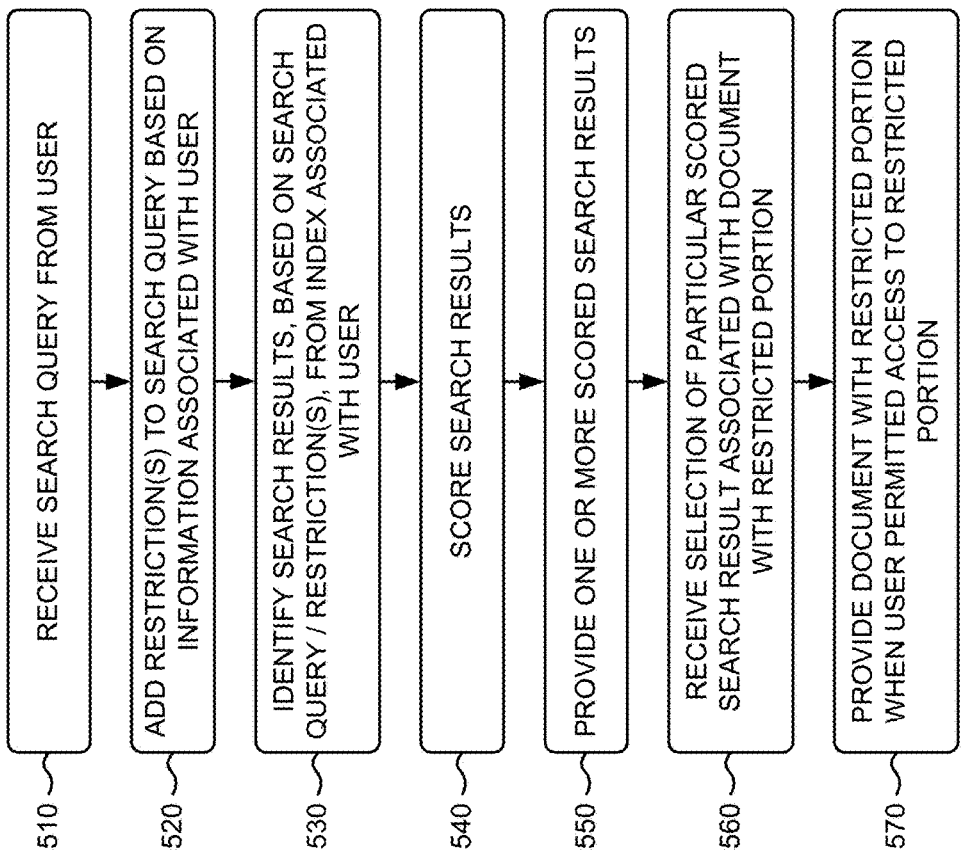

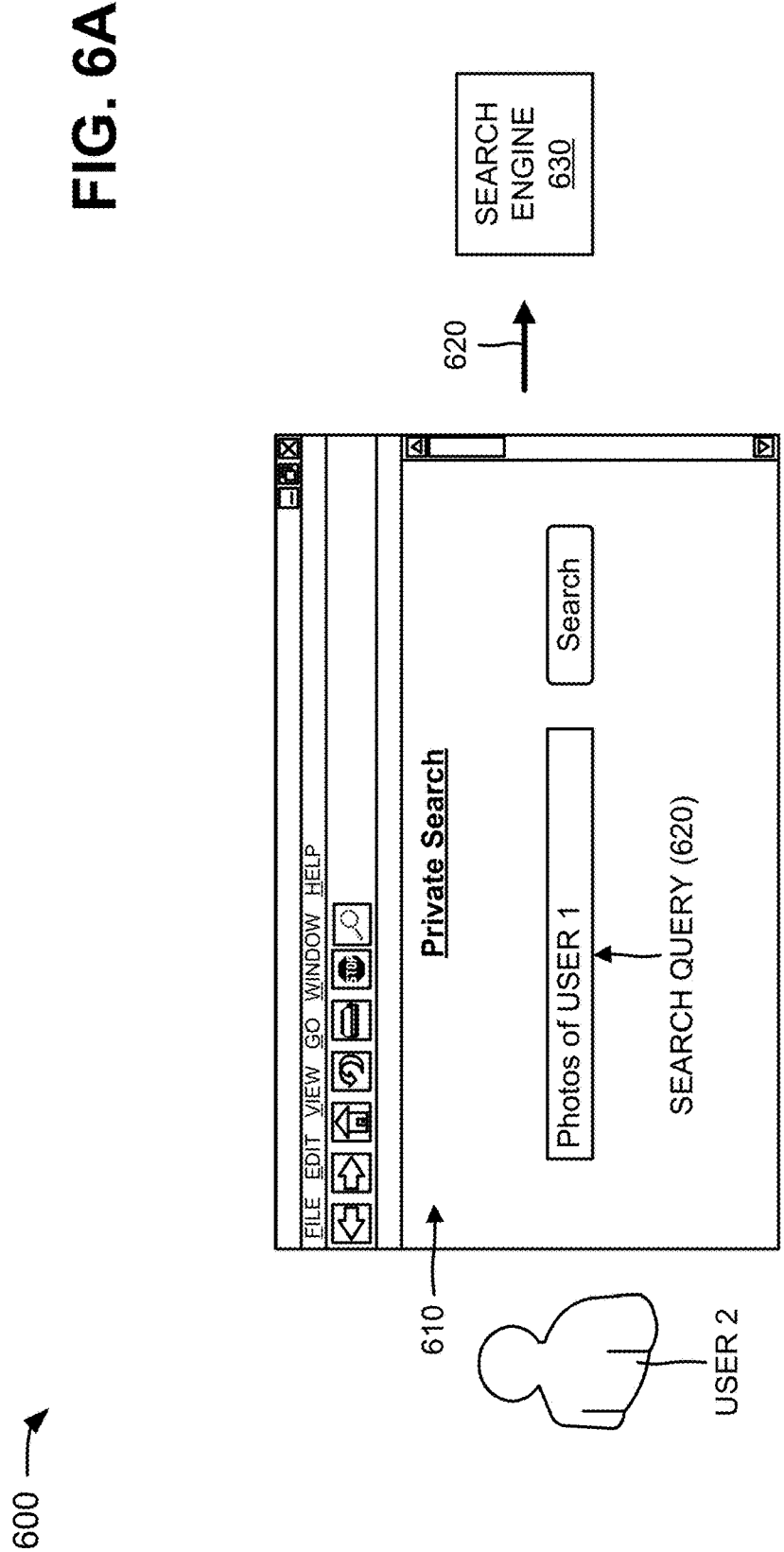

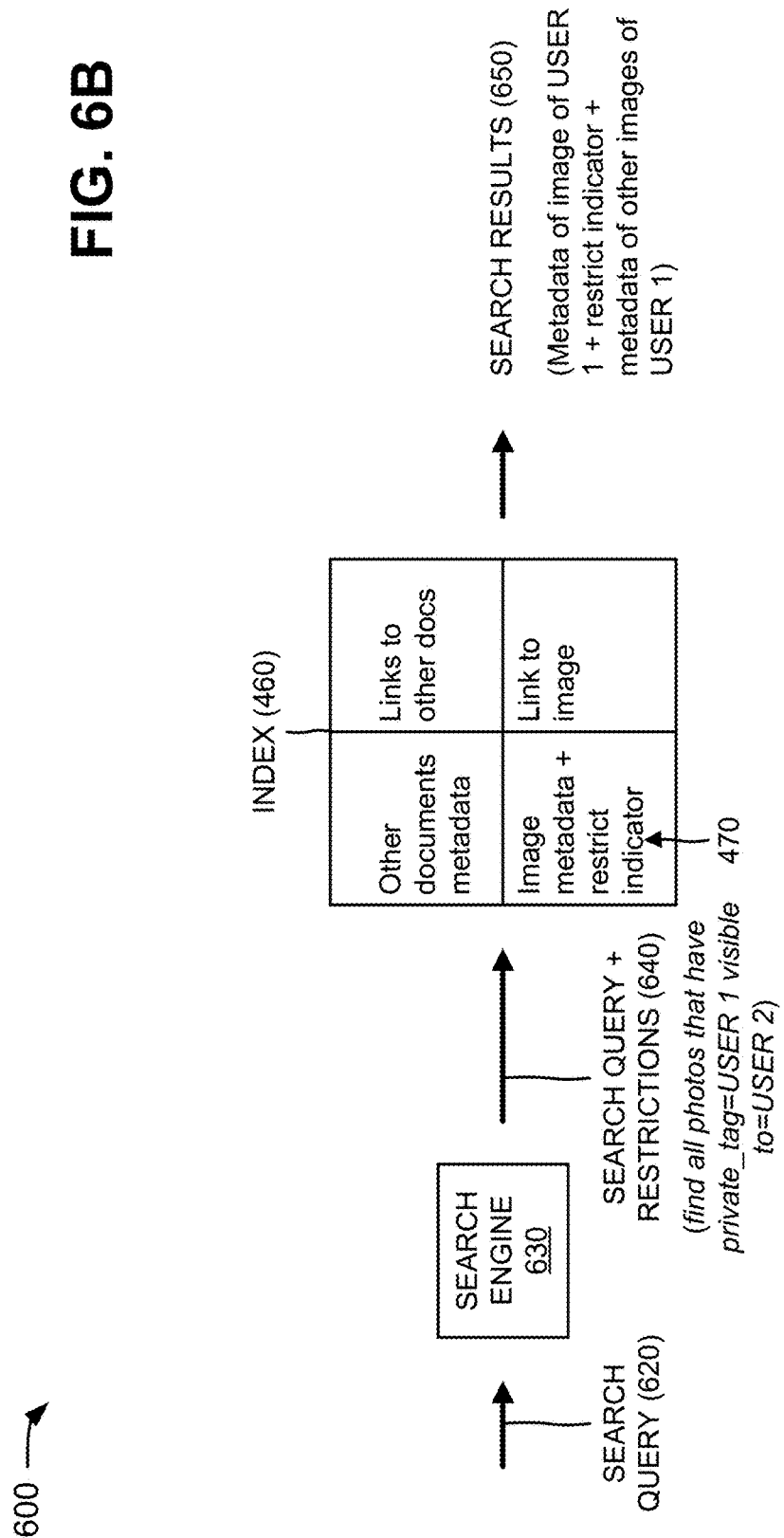

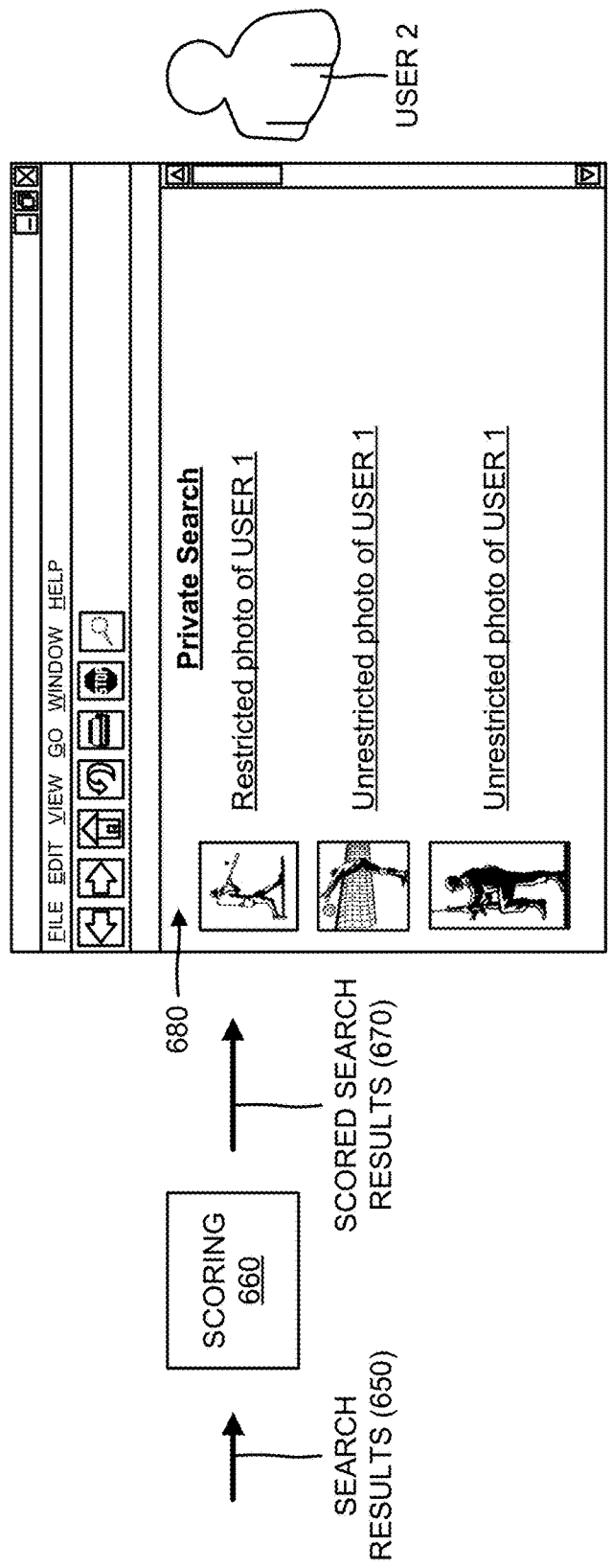

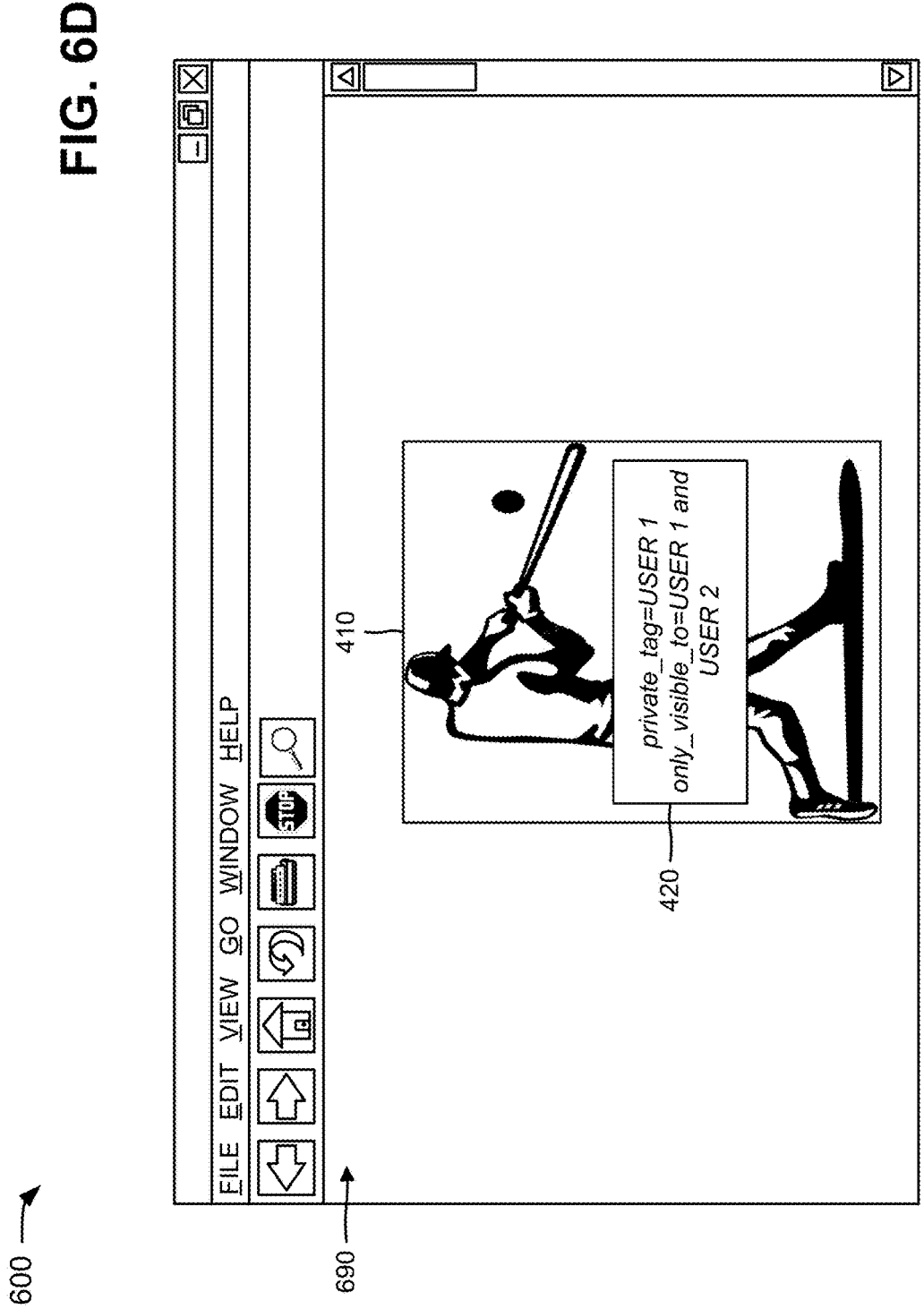

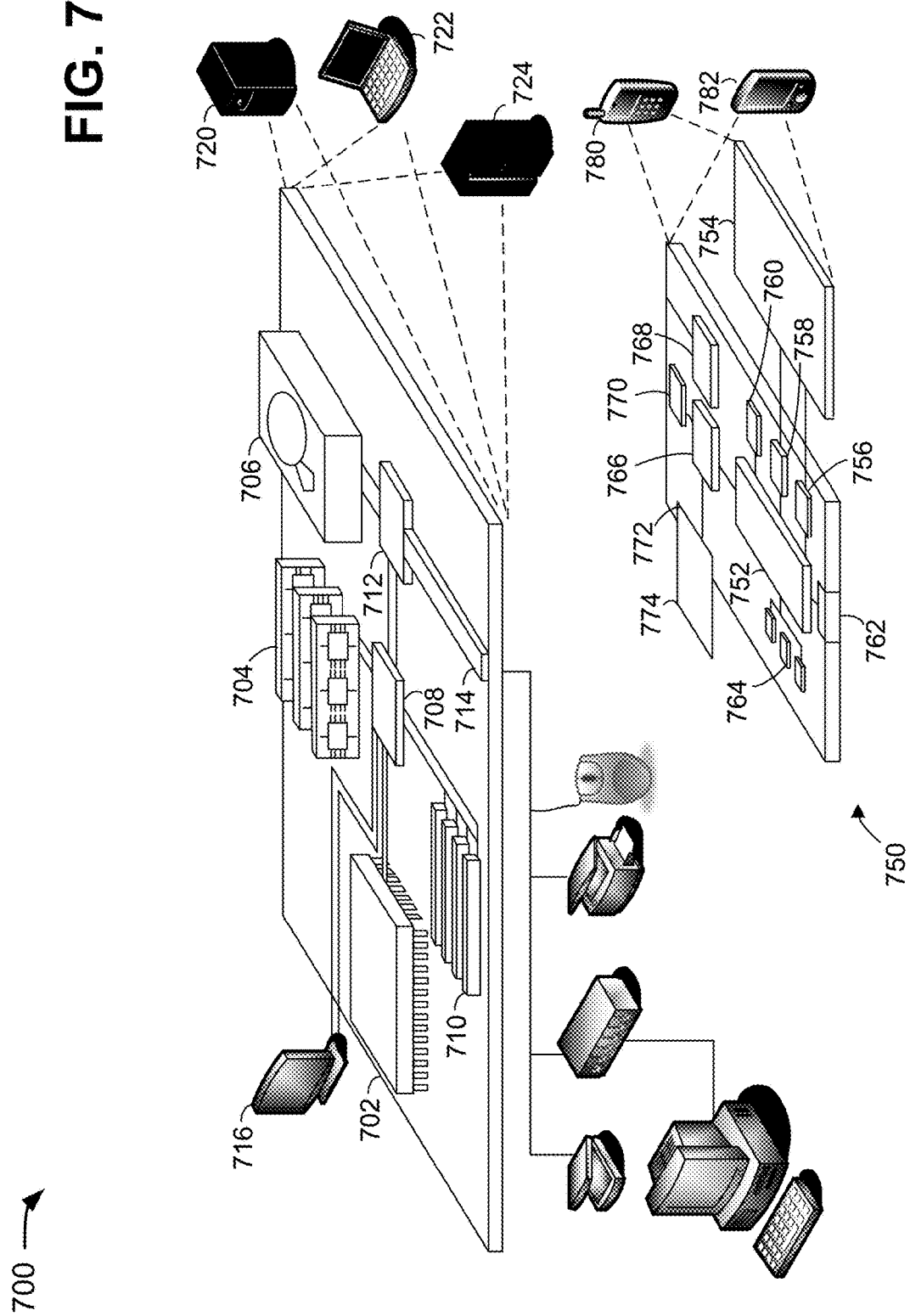

INDEXING AND SEARCHING DOCUMENTS WITH RESTRICTED PORTIONS

RELATED APPLICATION

This application is a continuation of U.S. application Ser. No. 14/109,433, filed Dec. 17, 2013, which claims the benefit of U.S. Provisional Patent Application No. 61/823,086, filed May 14, 2013, the disclosure of each are incorporated by reference herein in its entirety.

BACKGROUND

Current personal search systems enable a set of users to search private content accessible only to the set of users. For example, the personal search systems may provide search results that include tips, photos, posts, etc. from the set of users and are personal and private to the set of users. However, in such personal search systems, if one user of the set of users has access to a document or a piece of content, all users of the set of users can search the metadata of the document in an index associated with the personal search system.

SUMMARY

Described herein are devices and techniques for appending a restrict indicator to metadata associated with a document that includes a portion that is only to be accessible by particular user(s) of a set of users. The devices and techniques may store the document metadata and the restrict indicator in a personal search index. The devices and techniques may interpret a user's search query and may add restrictions to the search query based on information associated with the user. The personal search index may return a search result that identifies the document that includes the portion that is only to be accessible by the user.

In some possible implementations, a method, performed by one or more computer devices, may include: receiving a document from private content, the private content being accessible by a set of users; extracting metadata from the document, the metadata providing information relating to one or more aspects of the document; determining, based on the metadata, whether a portion of the document includes information that is only to be accessible by a particular user from the set of users; appending a restrict indicator to the metadata when the portion of the document includes information that is only to be accessible by the particular user, the restrict indicator identifying the particular user and the portion of the document; and storing the metadata and the restrict indicator in a personal search index.

In some possible implementations, the method may further include storing only metadata in the personal search index for a second document that is accessible to the set of users.

In some possible implementations, the method may further include: receiving a search query from the particular user; adding a restriction to the search query based on information associated with the particular user; and identifying search results, based on the search query and the restriction, from the personal search index, the search results including information identifying the document.

In some possible implementations, the method may further include: comparing the restriction and the restrict indicator; and identifying, from the personal search index, the document in the search results based on the comparing.

In some possible implementations, the method may further include: scoring the search results; and providing the scored search results to the particular user.

In some possible implementations, the method may further include: receiving a selection of a particular scored search result of the scored search results, the particular scored search result being associated with the document; and providing the document and the portion of the document to the particular user.

In some possible implementations, the method may further include: receiving a selection of a particular scored search result of the scored search results, the particular scored search result being associated with a second document that includes a restricted portion that is not accessible by the particular user; and providing the second document, without the restricted portion, to the particular user.

In some possible implementations, a device may include one or more processors to: receive a document from private content that is accessible by a set of users; extract metadata from the document, the metadata providing information relating to one or more aspects of the document; determine, based on the metadata, whether a portion of the document includes information that is only to be accessible by a particular user from the set of users; append a restrict indicator to the metadata when the portion of the document includes information that is only to be accessible by the particular user, the restrict indicator identifying the particular user and the portion of the document; and store the metadata and the restrict indicator in a personal search index.

In some possible implementations, the one or more processors may be further to: store only metadata in the personal search index for a second document that is accessible to the set of users.

In some possible implementations, the one or more processors may be further to: receive a search query from the particular user; add a restriction to the search query based on information associated with the particular user; and identify search results, based on the search query and the restriction, from the personal search index, the search results including information identifying the document.

In some possible implementations, the one or more processors may be further to: compare the restriction and the restrict indicator; and identify, from the personal search index, the document in the search results based on the comparing.

In some possible implementations, the one or more processors may be further to: score the search results; and provide the scored search results to the particular user.

In some possible implementations, the one or more processors may be further to: receive a selection of a particular scored search result of the scored search results, the particular scored search result being associated with the document; and provide the document and the portion of the document to the particular user.

In some possible implementations, the one or more processors may be further to: receive a selection of a particular scored search result of the scored search results, the particular scored search result being associated with a second document that includes a restricted portion that is not accessible by the particular user; and provide the second document, without the restricted portion, to the particular user.

In some possible implementations, a computer-readable medium may store one or more instructions that, when executed by a processor of a device, cause the processor to: receive a document from private content that is accessible by a set of users; extract metadata from the document, the metadata providing information relating to one or more aspects of the document; determine, based on the metadata, whether a portion of the document includes information that is only to be accessible by a particular user from the set of users; append a restrict indicator to the metadata when the portion of the document includes information that is only to be accessible by the particular user, the restrict indicator identifying the particular user and the portion of the document; and store the metadata and the restrict indicator in a personal search index.

In some possible implementations, the computer-readable medium may further include one or more instructions that, when executed by the processor, cause the processor to: store only metadata in the personal search index for a second document that is accessible to the set of users.

In some possible implementations, the computer-readable medium may further include one or more instructions that, when executed by the processor, cause the processor to: receive a search query from the particular user; add a restriction to the search query based on information associated with the particular user; and identify search results, based on the search query and the restriction, from the personal search index, the search results including information identifying the document.

In some possible implementations, the computer-readable medium may further include one or more instructions that, when executed by the processor, cause the processor to: compare the restriction and the restrict indicator; and identify, from the personal search index, the document in the search results based on the comparing.

In some possible implementations, the computer-readable medium may further include one or more instructions that, when executed by the processor, cause the processor to: score the search results; and provide the scored search results to the particular user.

In some possible implementations, the computer-readable medium may further include one or more instructions that, when executed by the processor, cause the processor to: receive a selection of a particular scored search result of the scored search results, the particular scored search result being associated with the document; and provide the document and the portion of the document to the particular user.

In some possible implementations, a system may include means for receiving a document from private content that is accessible by a set of users; means for extracting metadata from the document, the metadata providing information relating to one or more aspects of the document; means for determining, based on the metadata, whether a portion of the document includes information that is only to be accessible by a particular user from the set of users; means for appending a restrict indicator to the metadata when the portion of the document includes information that is only to be accessible by the particular user, the restrict indicator identifying the particular user and the portion of the document; and means for storing the metadata and the restrict indicator in a personal search index.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate some implementations described herein and, together with the description, explain these implementations. In the drawings:

FIGS. 1A and 1B are diagrams illustrating an overview of some implementations described herein;

FIG. 2 is a diagram of an example environment in which systems and/or methods described herein may be implemented;

FIG. 3 is a flowchart of an example process for indexing documents with restricted portions;

FIGS. 4A-4C are diagrams of an example of the process of FIG. 3;

FIG. 5 is a flowchart of an example process for searching documents with restricted portions;

FIGS. 6A-6D are diagrams of an example of the process of FIG. 5; and

FIG. 7 is an example of a generic computer device and a generic mobile computer device according to some implementations.

DETAILED DESCRIPTION

The following detailed description refers to the accompanying drawings. The same reference numbers in different drawings may identify the same or similar elements.

Systems and/or methods, as described herein, may provide an indexing mechanism that appends a restrict indicator to metadata associated with a document that includes a portion that is only to be accessible by particular user(s) (e.g., an owner or creator of the document) of a set of users. The indexing mechanism may store the document metadata and the restrict indicator in a personal search index. The systems and/or methods may provide a query mechanism that interprets a user's search query and adds restrictions to the search query based on information associated with the user (e.g., user identification). For example, the query mechanism may add a restriction that enables the user to search, in the personal search index, for a document that includes a portion that is only to be accessible by the user. The personal search index may return a search result that identifies the document that includes the portion that is only to be accessible by the user. Whereas another user issuing the same search query, and who does not have access to the portion of the document, may not receive the search result that identifies the document.

The term document, as used herein, is to be broadly interpreted to include any machine-readable and machine-storable work product. A document may include, for example, a website, an e-mail, a business listing, a file, a combination of files, one or more files with embedded links to other files, a news group posting, a blog, etc. In the context of the Internet, a common document is a web page. Documents often include textual information and may include embedded information, such as meta information, images, hyperlinks, etc., and/or embedded instructions, such as Javascript, etc. In some implementations, metadata (e.g., face tags, computer vision labels, and other types of metadata) may relate to, be derived, and/or be associated with a document.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a user device (e.g., via a touch screen display, a mouse, a keyboard, a keypad, voice commands, etc.).

Figure 1B:
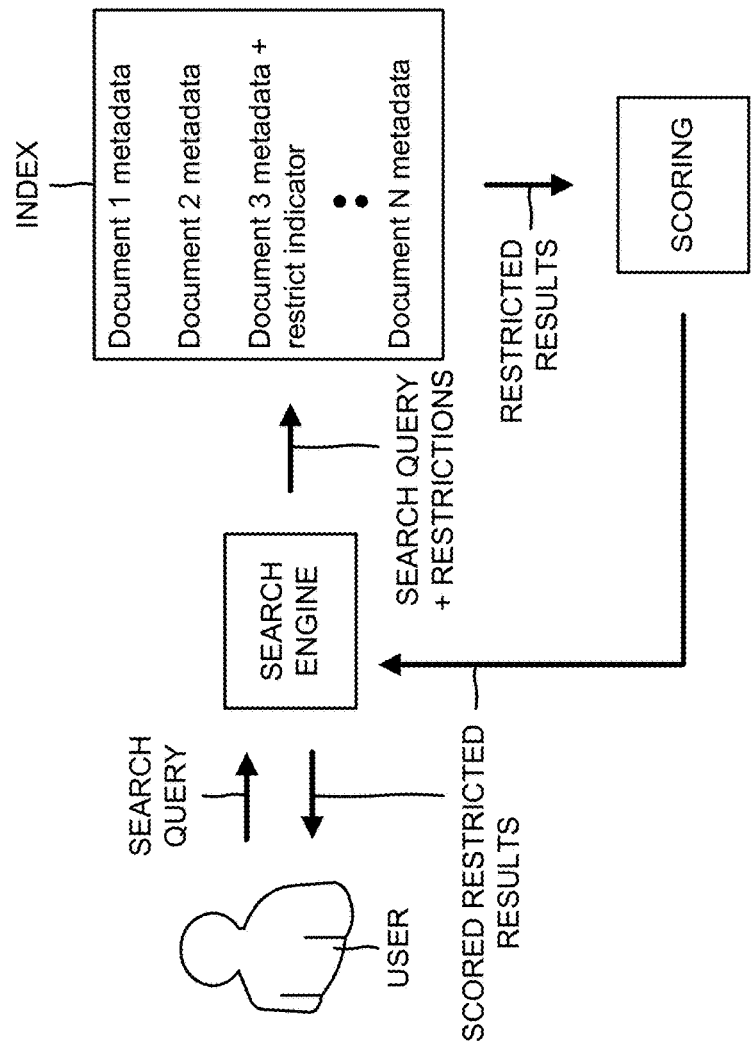

FIGS. 1A and 1B are diagrams illustrating an overview of some implementations described herein. For the overview and as shown in FIG. 1A, assume that a personal search system includes private content (e.g., one or more documents) that may be visible and/or searchable (i.e., accessible) by a set of users. Further assume that the private content includes a particular document (e.g., Document 3) with a portion that is to be visible and/or searchable only by particular user(s) of the set of users. As further shown in FIG. 1A, the personal search system may include an indexer component that receives the documents from the private content. The indexer component may extract metadata associated with each document, and may store the document metadata in a personal search index. If the document is an image, the metadata may include, for example, information that describes how large the image is, a color depth of the image, a resolution of the image, when the image was created, etc. If the document is a text document, the metadata may include, for example, information about a length of the document, an author of the document, when the document was written, a summary of the document, etc. For example, as shown in FIG. 1A, the document metadata may include metadata associated with a first document (e.g., Document 1), a second document (e.g., Document 2), etc.

The indexer component may determine, based on the document metadata, whether a portion of a document includes information that is only to be accessible by a particular user(s) from the set of users. For example, the indexer component may determine that a portion of the particular document (e.g., Document 3) includes information that is only to be accessible by the particular user(s). The indexer component may append a restrict indicator to the metadata of the particular document. The restrict indicator may identify the particular user and the portion of the particular document. In some implementations, the indexer component may determine that a portion of a document is accessible to a certain class of users, and may assign a restrict indicator to the certain class of users (e.g., as opposed to enumerating each member of the certain class). As further shown in FIG. 1A, the indexer component may store the particular document metadata and the restrict indicator in the personal search index.

With reference to FIG. 1B, assume that personal search system includes a search engine component that receives a search query from a user. Assume further that the search query relates to the particular document (e.g., Document 3) and/or the restricted portion of the particular document. The search engine component may add a restriction(s) to the search query based on information associated with the user (e.g., user identification). The restriction(s) may include information identifying document portions that are accessible by the user. For example, the restriction(s) may specify that the portion of the particular document (e.g., Document 3) is accessible by the user.

The search engine component may compare the search query and the restriction(s) with the personal search index, and may identify search result(s) based on the search query and the restriction(s). For example, the search engine component may identify the particular document in the search result(s) based on the restriction(s) matching the restrict indicator. The search engine component may provide the search result(s) to a scoring component of the personal search system. The scoring component may score the search result(s), and may provide the scored search result(s) to the user, via the search engine component. At least one of the scored search result(s) may include, for example, information associated with the particular document (e.g., Document 3), the restricted portion of the particular document, etc.

FIG. 2 is a diagram of an example environment 200 in which systems and/or methods described herein may be implemented. Environment 200 may include a user device 210 connected to multiple server devices 220-240 via a network 250.

User device 210 may include a device capable of interacting with server device 220 to perform a search. Examples of user device 210 may include a personal computer, a laptop computer, a tablet computer, a personal digital assistant, a mobile telephone, such as a smart phone, etc. User device 210 may include user interfaces presented through one or more browsers, e.g., web browsers.

Server devices 220-240 may include server devices that gather, process, search, and/or implement functions in a manner described herein. Each server device 220-240 may be implemented as a single server device or a collection of server devices that may be co-located or remotely located. In some implementations, any two or more of server devices 220-240 may be implemented within a single, common server device or a single, common collection of server devices. While server devices 220-240 are shown as separate components, it may be possible for one or more of server devices 220-240 to perform one or more of the functions of another one or more of server devices 220-240.

As shown in FIG. 2, server device 220 may implement a search system 225 that receives search queries from user device 210, and that provides search results that are responsive to the search queries. In some implementations, search system 225 may include a personal search system that enables a set of users to search private content accessible only to the set of users. Server device 220 may crawl a corpus of documents, e.g., web pages, index the documents, and store information associated with the documents. Server devices 230 and 240 may store or maintain documents that may be crawled or analyzed by server device 220.

Network 250 may include any type of network, such as, for example, a local area network, also referred to as a "LAN," a wide area network, also referred to as a "WAN," a telephone network, such as the Public Switched Telephone Network (PSTN) or a cellular network, an intranet, the Internet, a combination of networks, etc. User device 210 and server devices 220-240 may connect to network 250 via wired and/or wireless connections. In other words, any one of user device 210 and server devices 220-240 may connect to network 250 via a wired connection, a wireless connection, or a combination of a wired connection and a wireless connection.

Although FIG. 2 shows example components of environment 200, in some implementations, environment 200 may include additional components, fewer components, different components, and/or differently arranged components than those depicted in FIG. 2. Additionally, or alternatively, one or more components of environment 200 may perform one or more tasks described as being performed by one or more other components of environment 200.

FIG. 3 is a flowchart of an example process 300 for indexing documents with restricted portions. In some implementations, process 300 may be performed by server device 220, such as by search system 225 of server device 220. In some implementations, process 300 may be performed by one or more other devices instead of, or possibly in conjunction with, server device 220.

Process 300 may include receiving a document from private content that includes a group of documents and is accessible by a set of users (block 310). For example, server device 220 and/or servers 230/240 may include a repository of private content. The private content may include one or more documents that may only be visible and/or searchable (i.e., accessible) by a set of users. In some implementations, the private content may include blog posts, images, videos, text documents, etc. stored by the set of users in the repository. Server device 220 (e.g., search system 225) may receive a document from the private content in a number of ways. For example, search system 225 may request the document from the repository, and the repository may provide the document to search system 225 based on the request. In some implementations, search system 225 may crawl the private content, and may receive the document based on crawling the private content.

In some implementations, one or more documents of the private content may include portion(s) that are only to be accessible to a subset (e.g., one or more particular users) of the set of users. For example, a user of the set of users may provide photos in the private content and may identify who is in each photo by tagging their faces with names. Different users of the set of users may tag a same photo as the user. The set of users may have access to the user's photos, but the user may mark the tags as private and restricted to particular users.

Process 300 may further include extracting metadata from the document (block 320). For example, server device 220, e.g., an indexer component of search system 225, may extract metadata from the document. If the document is an image, the metadata may include, for example, information that describes how large the image is, a color depth of the image, a resolution of the image, when the image was created, etc. If the document is a text document, the metadata may include, for example, information about a length of the document, an author of the document, when the document was written, a summary of the document, etc.

In some implementations, the indexer component may extract information from text and/or hypertext markup language (HTML) code of the document, and may associate the extracted information, as keywords, with information identifying the document. In one example, the indexer component may create, from the HTML code of the document, keywords relating to visual features of the document. For example, the indexer component may create, from the HTML code of the document, a keyword corresponding to the color of the background of the document, a keyword corresponding to the color of the text in the document, a keyword corresponding to the size of the text in the document, a keyword indicating whether the document includes an image, a keyword associated with a geographic location, e.g., global satellite coordinates, associated with an image in the document, a keyword indicating a date and/or time when the image was captured, and/or a keyword indicating the quantity of images in document.

Process 300 may further include determining, based on the metadata, whether a portion of the document includes information only to be accessible by a particular user(s) of the set of users (block 330). For example, server device 220, e.g., the indexer component of search system 225, may analyze the metadata of the document to determine whether any portion of the document includes information that is only to be accessible by one or more particular users of the set of users. In one example, if the document is an image, the indexer component may analyze the metadata of the image to determine whether there are private tags (e.g., private face tags) associated with the image. In some implementations, if the document includes private location information, associated with a user of the set of users, the indexer component may analyze the document metadata to identify the private location information. In some implementations, if the document is a presentation, the indexer component may analyze the metadata of the presentation to determine whether there are private notes associated with the presentation. The private tags, the private location information, and the private notes may be considered portions of a document that include information that is only to be accessible by the particular user(s).

In some implementations, two or more different portions of a document may be marked as private (i.e., restricted) to the same user, to different users, etc. For example, a first portion of an image may be marked as private to a first user, and a second, different portion of the image may be marked as private to a second user. In some implementations, an entire document may be restricted to a subset of users of the set of users, and one or more portions of the document may be restricted to a subset of the subset of users. For example, if the set of users includes one-hundred (100) people, the entire document may be restricted to ten (10) people from the set of users, and portion(s) of the document may be restricted to three (3) of the ten people.

As further shown in FIG. 3, if the portion of the document includes information only to be accessible by the particular user(s) of the set of users (block 330—YES), process 300 may include appending a restrict indicator to the metadata (block 340). For example, server device 220, e.g., the indexer component of search system 225, may determine that a portion of the document includes information that is only to be accessible by a particular user of the set of users. Based on this determination, the indexer component may append a restrict indicator to the metadata associated with the document. The restrict indicator may identify the particular user, the portion of the document, and/or the information provided in the document portion. For example, if the document is an image that includes a private tag, the restrict indicator may include the following information:

private_tag—NameOfPerson_only_visible_to—NameOfImageOwner.

If the document is a text document that includes pages that are restricted to particular user(s), the restrict indicator may identify the particular user(s) and the pages of the text document that are restricted.

In some implementations, if two or more different portions of a document are restricted to particular user(s), the indexer component may append a restrict indicator for each of the two or more different portions. In some implementations, the indexer component may append a single restrict indicator for the two or more different portions of the document.

Process 300 may also include storing the metadata and the restrict indicator in a personal search index (block 350). For example, server device 220, e.g., the indexer component of search system 225, may store the metadata and the restrict indicator, associated with the document, in a personal search index. The document metadata and the restrict indicator may be searched by the set of users in the personal search index. The restrict indicator may be used to instruct the personal search index to provide search results, which include the document with the private portion, to only the particular user(s) with access to the private portion of the document. In some implementations, the search results may provide the document to all users of the set of users but may block out the portion for the set of users, except for the particular user(s). For example, if the document is an image that includes a restricted portion, the search results may provide the image to the set of users but may blur (e.g., via image processing) the restricted portion for the set of users, except for the particular user(s).

As further shown in FIG. 3, if the portion of the document does not include information only to be accessible by the particular user(s) of the set of users (block 330—NO), process 300 may include storing the metadata in the personal search index (block 360). For example, server device 220, e.g., the indexer component of search system 225, may determine that a portion of the document does not include information that is only to be accessible by a particular user of the set of users. Based on this determination, the indexer component may store the document metadata in the personal search index. In this situation, the indexer component would not associate a restrict indicator with the metadata.

Although FIG. 3 shows example blocks of process 300, in some implementations, process 300 may include additional blocks, different blocks, fewer blocks, and/or differently arranged blocks than those depicted in FIG. 3. Additionally, or alternatively, one or more of the blocks of process 300 may be performed in parallel.

Figure 4C:
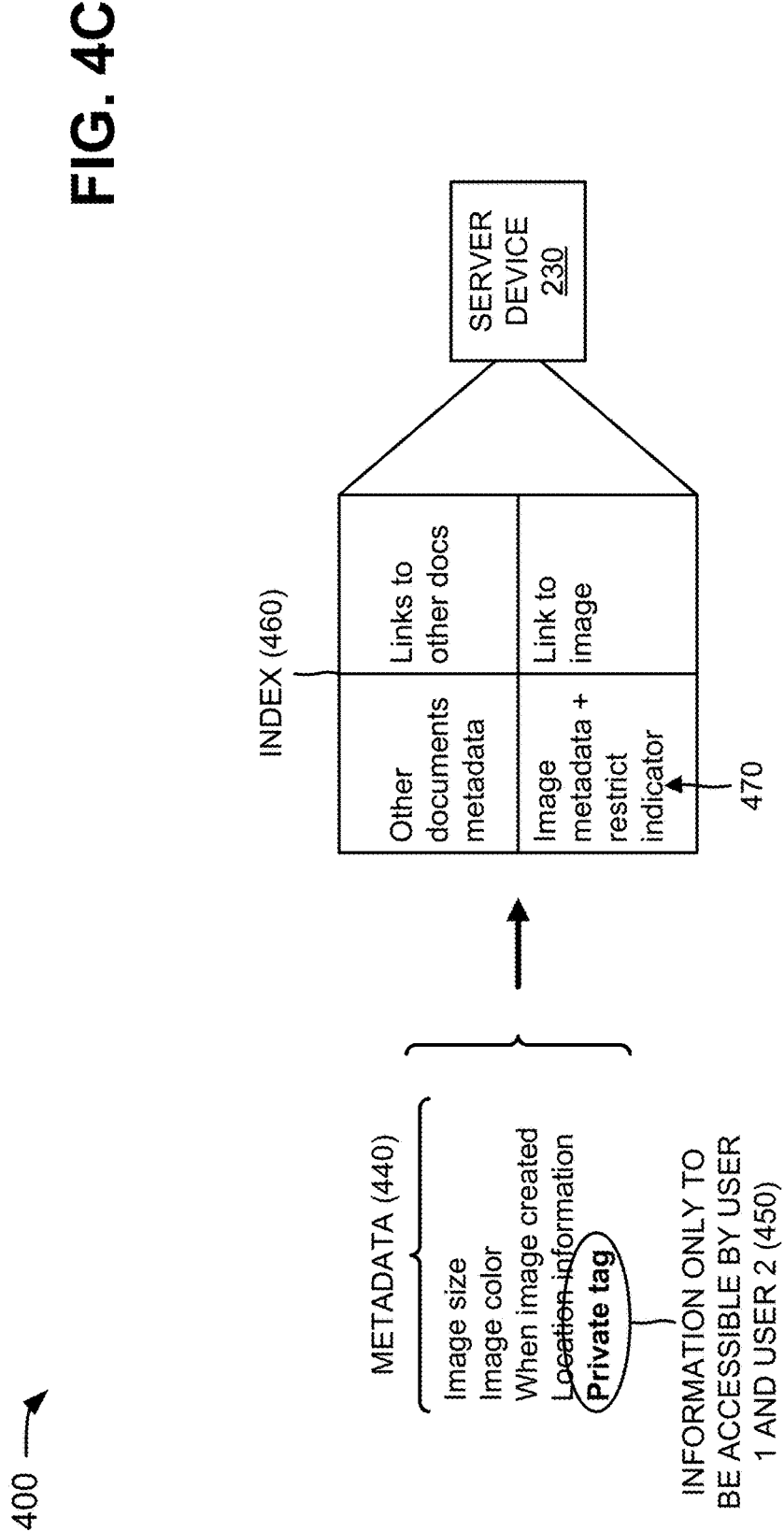

FIGS. 4A-4C are diagrams of an example 400 of the process described above with respect to FIG. 3. In example 400, assume that a first user (e.g., USER 1), of a set of users, is associated with user device 210 (not shown in FIG. 4A). Further assume that user device 210 includes an image of the first user, identified as document 410 in FIG. 4A. The first user may provide a private tag 420 in a portion of document 410, and may want document 410 and/or private tag 420 to be visible and/or searchable (i.e., accessible) by the first user and a second user (not shown in FIG. 4A). For example, the first user may provide, in private tag 420, information that indicates that private tag 420 is only to be accessible by the first user and the second user (e.g., USER 2).

The first user may instruct user device 210 to provide document 410 and private tag 420 to a repository of private content. In some implementations, the repository of the private content may be provided in server device 230 (e.g., as shown in FIG. 4A), server device 220, and/or server device 240. The private content may include one or more documents that may be visible and/or searchable (i.e., accessible) by the set of users. Server device 230, e.g., the repository, may receive document 410 and private tag 420, and may store document 410 and private tag 420, as further shown in FIG. 4A.

In example 400 and as shown in FIG. 4B, further assume that search system 225 includes an indexer component 430 that receives documents from the private content, and extracts metadata from the documents for a personal search index (e.g., not shown in FIG. 4B). As further shown in FIG. 4B, indexer component 430 may receive document 410 and private tag 420 from the private content and may extract metadata 440 from document 410 (e.g., the image of the first user). Metadata 440 may include, for example, information associated with a size of the image, a color of the image, when the image was created, etc.; location information associated with the image; information associated with private tag 420; etc.

Indexer component 430 may analyze metadata 440 to determine whether a portion of document 410 includes information only to be accessible by particular user(s) of the set of users. In example 400 and as shown in FIG. 4C, indexer component 430 may identify the private tag information as a portion of document 410 that includes information 450 only to be accessible by the particular user(s). For example, the private tag information may indicate that private tag 420 is only to be accessible by the first user and the second user.

Based on the identification of information 450, indexer component 430 may provide metadata 440 of document 410 in a personal search index 460, as further shown in FIG. 4C. Personal search index 460 may be provided in server device 230 (e.g., as shown in FIG. 4C), server device 220, and/or server device 240. Personal search index 460 may include an index that is searchable by the set of users associated with the private content. Personal search index 460 may store information (e.g., metadata) associated with other documents, and may associate the metadata from the other documents with information identifying the other documents. Personal search index 460 may store metadata 440 associated with document 410, and may associate metadata 440 with information identifying document 410. Based on the identification of information 450, indexer component 430 may append a restrict indicator 470 to metadata 440 in personal search index 460. Restrict indicator 470 may identify the first user and the second user, private tag 420, and/or the information provided in private tag 420. For example, restrict indicator 470 may include the following information:

private_tag=USER 1 only_visible_to=USER 1 and USER 2.

If document 410 did not include private tag 420, indexer component 430 may determine that document 410 does not include information only to be accessible by particular user(s) of the set of users. In such a scenario, indexer component 430 may provide metadata 440 of document 410 to personal search index 460, and personal search index 460 may store metadata 440 without a restrict indicator.

As indicated above, FIGS. 4A-4C are provided merely as an example. Other examples are possible and may differ from what was described with regard to FIGS. 4A-4C.

FIG. 5 is a flowchart of an example process 500 for searching documents with restricted portions. In some implementations, process 500 may be performed by server device 220, such as by search system 225 of server device 220. In some implementations, process 500 may be performed by one or more other devices instead of, or possibly in conjunction with, server device 220.

Process 500 may include receiving a search query from a user (block 510). For example, a user may provide a search query to user device 210, and user device 210 may provide the search query to server device 220, e.g., search system 225 of server device 220. In some implementations, search system 225 may include a search engine component that receives the search query from user device 210. In some implementations, the search query may be directed to a search for one or more documents provided in the private content and indexed in personal search index 460 (FIG. 4C). For example, the search query may be directed to a search for images associated with a particular user of the set of users.

Process 500 may also include adding one or more restrictions to the search query based on information associated with the user (block 520). For example, the search engine component of search system 225 may add one or more restrictions to the search query based on information associated with the user of user device 210. In some implementations, the search engine component may include a data structure that associates the user information (e.g., user identification) with restrictions that are associated with the user. The information associated with the user may include information identifying the user, a location of user device 210, etc. The restriction(s) may include information identifying document portion(s) that are accessible by the user. In some implementations, a single restriction may be provided for the user and may include a list of documents with portions marked as private to the user. For example, the restriction(s) may specify that a portion of a particular document is accessible by the user. In some implementations, if the particular document is an image and the portion of the particular document is a private tag associated with the user, the restriction(s) may include the following information:

private_tag=User visible to=User.

In some implementations, the user may provide one or more restrictions in the search query, with or without the aid of the search engine component. For example, the user may provide private tags, such as private_tag=User visible to=User, in the search query. Such a search query may return search results associated with documents that include private tags that are restricted to the user.

Process 500 may further include identifying search results, based on the search query and the restriction(s), from a personal search index associated with the user (block 530). For example, the user may be associated with the set of users and personal search index 460 (FIG. 4C). The search engine component of search system 225 may compare the search query and the restriction(s) to information provided in personal search index 460, and may identify search results based on the comparison. In some implementations, the search engine component may identify documents by determining which terms of the search query match the document metadata provided in personal search index 460. The search engine component may determine whether any of the identified documents are associated with restrict indicators. If particular documents of the identified documents are associated with restrict indicators, the search engine component may determine whether the restrict indicators associated with the particular documents match the restriction(s). The search engine component may include the particular documents with matching restrict indicators in the search results, and may not include the particular documents without matching restrict indicators in the search results.

For example, if the search query is directed to a search for images of the user, the search engine component may search personal search index 460 for metadata associated with images of the user. The search engine component may also search personal search index 460 for restrict indicators associated with images of the user that are accessible by the user. The search engine component may identify the search results based on the searches of personal search index 460. In some implementations, the search results may include one or more images, e.g., of the user, that do not include private information and/or one or more images, e.g., of the user, that include private information.

Process 500 may additionally include scoring the search results (block 540). For example, the search engine component of search system 225 may provide the search results to a scoring component of search system 225. The scoring component may score the search results. In some implementations, the scoring component may score the search results based on the search query and/or the restriction(s).

Process 500 may further include providing one or more scored search results (block 550). For example, the scoring component of search system 225 may provide one or more scored search results to user device 210, and user device 210 may display the one or more scored search results to the user. In some implementations, the scored search result(s) may include a ranked list of scored search results that is sorted according to the scores allotted to the search results. In some implementations, at least one scored search result may be associated with a document that includes a portion only to be accessible by particular user(s) of the set of users. In some implementations, the scored search results may include documents with private portions that are not accessible to the particular user. Such documents may be visible to the particular user, but the private portions may not be visible to the particular user. For example, if Bob is the particular user and wants to search for "photos of Matt," the scored search results may include image(s) of Matt that do not include private portions, image(s) of Matt with the private portions that are accessible by Bob, and/or image(s) of Matt with the private portions blocked since that are not accessible by Bob. Alternatively, the scored search results may not include image(s) of Matt that have private portions not accessible to Bob.

In some implementations, search system 225 may pre-filter the search results that are returned to the user based on the restriction(s) added to the search query and/or the restrict indicators provided in personal search index 460. For example, search system 225 may not return, to the user, search results associated with documents that include portions not accessible to the user. In some implementations, search system 225 may return search results associated with documents that include portions not accessible to the user, and may provide such documents to the user. However, search system 225 may block (i.e., remove) the portions not accessible to the user from such documents.

In some implementations, search system 225 may post-filter the search results that are returned to the user based on the restriction(s) added to the search query and/or the restrict indicators provided in personal search index 460. For example, the search engine of search system 225 may return all search results associated with the search query, and may remove search results associated with documents that include portions not accessible to the user (e.g., based on the restriction(s)).

Process 500 may also include receiving a selection of a particular scored search result associated with a document with a restricted portion (block 560). For example, the user may utilize user device 210 to select a particular scored search result from the displayed one or more scored search results. In some implementations, the particular scored search result may be associated with a document that includes a portion only to be accessible by particular user(s) of the set of users. For example, the particular scored search result may include information associated with an image with a private tag that is only to be accessible to the user of user device 210. User device 210 may provide the selection to server device 220, e.g., search system 225 of server device 220, and search system 225 may receive the selection.

Process 500 may include providing the document with the restricted portion when the user is permitted access to the restricted portion (block 570). For example, based on the selection of the particular scored search result, search system 225 of server device 220 may retrieve, from the private content, the document that includes the portion only to be accessible by the user of user device 210. Search system 225 may provide the document to user device 210, and user device 210 may display the document to the user. Since the user has access to the restricted portion of the document, the user may view the restricted portion of the document.

Although FIG. 5 shows example blocks of process 500, in some implementations, process 500 may include additional blocks, different blocks, fewer blocks, and/or differently arranged blocks than those depicted in FIG. 5. Additionally, or alternatively, one or more of the blocks of process 500 may be performed in parallel.

FIGS. 6A-6D are diagrams of an example 600 of the process described above with respect to FIG. 5. In example 600, assume that a second user (e.g., USER 2) is associated with user device 210, and that user device 210 displays a user interface 610 to the second user, as shown in FIG. 6A. User interface 610 may be provided by the search engine component of search system 225, and may include information that enables the second user to perform a search for documents provided in the private content. As further shown in FIG. 6A, the second user may enter a search query 620 via user interface 610. In example 600, search query 620 may be directed to photos or images of a first user (e.g., USER 1). User device 210 may receive search query 620, and may provide search query 620 to a search engine component 630 of search system 225.

Search engine component 630 may receive search query 620, and may add restrictions 640 to search query 620 based on information associated with the second user, as shown in FIG. 6B. For example, search engine component 630 may add restrictions 640 to search query 620 based on the identification of the second user. In example 600, assume that restrictions 640 specify that portions of documents, related to search query 620, are accessible by the second user, based on the following:

find all photos that have private_tag=USER 1 visible to=USER 2.

Search engine component 630 may compare search query 620 to information contained in personal search index 460, as further shown in FIG. 6B, to identify documents that match search query 620. Search engine component 630 may determine whether any of the identified documents are associated with the restrict indicators. If particular documents of the identified documents are associated with the restrict indicators, search engine component 630 may determine whether the restrict indicators associated with the particular documents match restrictions 640. Search engine component 630 may include the particular documents with matching restrict indicators in search results 650, and may not include the particular documents without matching restrict indicators in search results 650.

In example 600 and as shown in FIG. 6B, assume that search results 650 include metadata of a particular image of the first user (e.g., USER 1), such as document 410 (FIG. 4A), restrict indicator 470 (FIG. 4C) associated with document 410, and metadata for other images of the first user. Further assume that the particular image includes a portion that is only to be accessible to the first user and the second user, and that the particular image may or may not be accessible to other users. For example, the particular image may include private tag 420 provided by the first user in document 410, as described above in connection with FIG. 4A.

Search engine component 630 may provide search results 650 to a scoring component 660 of search system 225, as shown in FIG. 6C. Scoring component 660 may score search results 650 to generate scored search results 670. In example 600, assume that scoring component 660 scores the metadata of document 410 higher than the metadata for other images of the first user. Scoring component 660 may provide scored search results 670 to user device 210, and user device 210 may display scored search results 670 in a user interface 680, as further shown in FIG. 6C. In example 600, user interface 680 may display the metadata of document 410 as a "Restricted photo of USER 1." User interface 680 may also display the metadata for other images of the first user as "Unrestricted photos of USER 1" (i.e., as not including restricted portions).

The second user may utilize user device 210 to select one of scored search results 670 from user interface 680. For example, the second user may select the "Restricted photo of USER 1" from user interface 680, and user device 210 may receive the selection. User device 210 may provide the selection to search system 225, and search system 225 may retrieve document 410 from the private content based on the selection. Search system 225 may provide document 410 to user device 210, and user device 210 may display document 410 in a user interface 690, as shown in FIG. 6D. The second user may view document 410 (e.g., the image of the first user) and information provided in private tag 420.

In some implementations, if a third user submits search query 620 and does not have access to private tag 420 in document 410, search system 225 may not return the metadata of document 410 in search results 650 to the third user. Alternatively, search system 225 may return the metadata of document 410 in search results 650 to the third user. However, if the third user selects the metadata of document 410, search system 225 may provide document 410 to the third user but may not provide private tag 420 of document 410 to the third user.

As indicated above, FIGS. 6A-6D are provided merely as an example. Other examples are possible and may differ from what was described with regard to FIGS. 6A-6D.

FIG. 7 is a diagram of an example of a generic computing device 700 and a generic mobile computing device 750, which may be used with the techniques described here. Generic computing device 700 or generic mobile computing device 750 may correspond to, for example, user device 210 and/or a server device 220, 230, or 240. Computing device 700 is intended to represent various forms of digital computers, such as laptops, desktops, workstations, personal digital assistants, servers, blade servers, mainframes, and other appropriate computers. Mobile computing device 750 is intended to represent various forms of mobile devices, such as personal digital assistants, cellular telephones, smart phones, tablet computers, and other similar computing devices. The components shown in FIG. 7, their connections and relationships, and their functions, are meant to be examples only, and are not meant to limit implementations described herein.

Computing device 700 may include a processor 702, a memory 704, a storage device 706, a high-speed interface 708 connecting to memory 704 and high-speed expansion ports 710, and a low-speed interface 712 connecting to a low-speed expansion port 714 and a storage device 706. Each of components 702, 704, 706, 708, 710, 712, and 714, are interconnected using various buses, and may be mounted on a common motherboard or in other manners as appropriate. Processor 702 can process instructions for execution within computing device 700, including instructions stored in memory 704 or on storage device 706 to display graphical information for a graphical user interface, also referred to as a "GUI," on an external input/output device, such as display 716 coupled to high-speed interface 708. In some implementations, multiple processors and/or multiple buses may be used, as appropriate, along with multiple memories and types of memory. Also, multiple computing devices 700 may be connected, with each device providing portions of the necessary operations, as a server bank, a group of blade servers, or a multi-processor system, etc.

Memory 704 stores information within computing device 700. In some implementations, memory 704 includes a volatile memory unit or units. In some implementations, memory 704 may include a non-volatile memory unit or units. Memory 704 may also be another form of computer-readable medium, such as a magnetic or optical disk. A computer-readable medium may refer to a non-transitory memory device. A memory device may refer to storage space within a single storage device or spread across multiple storage devices.

Storage device 706 is capable of providing mass storage for computing device 700. In some implementations, storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 704, storage device 706, or a memory on processor 702.

High-speed interface 708 manages bandwidth-intensive operations for computing device 700, while low-speed interface 712 manages lower bandwidth-intensive operations. Such allocation of functions is provided for explanatory purposes only. In some implementations, high-speed interface 708 may be coupled to memory 704, display 716, e.g., through a graphics processor or accelerator, and to high-speed expansion ports 710, which may accept various expansion cards. In some implementations, low-speed interface 712 may be coupled to storage device 706 and low-speed expansion port 714. Low-speed expansion port 714, which may include various communication ports, e.g., USB, Bluetooth, Ethernet, wireless Ethernet, etc., may be coupled to one or more input/output devices, such as a keyboard, a pointing device, a scanner, or a networking device such as a switch or router, e.g., through a network adapter.

Computing device 700 may be implemented in a number of different forms, as shown in the figure. For example, computing device 700 may be implemented as a standard server 720, or multiple times in a group of such servers. Computing device 700 may also be implemented as part of a rack server system 724. In addition, computing device 700 may be implemented in a personal computer, such as a laptop computer 722. Alternatively, components from computing device 700 may be combined with other components in a mobile device, such as mobile computing device 750. Each of such devices may contain one or more of computing devices 700, 750, and an entire system may be made up of multiple computing devices 700, 750 communicating with each other.

Mobile computing device 750 may include a processor 752, a memory 764, an input/output device, such as a display 754, a communication interface 766, and a transceiver 768, among other components. Mobile computing device 750 may also be provided with a storage device, such as a micro-drive or other device, to provide additional storage. Each of the components 752, 764, 754, 766, and 768 are interconnected using various buses, and several of the components may be mounted on a common motherboard or in other manners as appropriate.

Processor 752 can execute instructions within mobile computing device 750, including instructions stored in memory 764. Processor 752 may be implemented as a chipset of chips that include separate and multiple analog and digital processors. Processor 752 may provide, for example, for coordination of the other components of mobile computing device 750, such as control of user interfaces, applications run by mobile computing device 750, and wireless communication by mobile computing device 750.

Processor 752 may communicate with a user through control interface 758 and display interface 756 coupled to a display 754. Display 754 may be, for example, a Thin-Film-Transistor Liquid Crystal Display or an Organic Light Emitting Diode display, or other appropriate display technology. Display interface 756 may include appropriate circuitry for driving display 754 to present graphical and other information to a user. Control interface 758 may receive commands from a user and convert the commands for submission to processor 752. In addition, an external interface 762 may be provided in communication with processor 752, so as to enable near area communication of mobile computing device 750 with other devices. External interface 362 may provide, for example, for wired communication in some implementations, or for wireless communication in some implementations, and multiple interfaces may also be used.

Memory 764 stores information within mobile computing device 750. Memory 764 can be implemented as one or more of a computer-readable medium or media, a volatile memory unit or units, or a non-volatile memory unit or units. Expansion memory 774 may also be provided and connected to mobile computing device 750 through expansion interface 772, which may include, for example, a Single In Line Memory Module, also referred to as "SIMM," card interface. Such expansion memory 774 may provide extra storage space for device 750, or may also store applications or other information for mobile computing device 750. Specifically, expansion memory 774 may include instructions to carry out or supplement the processes described herein, and may include secure information also. Thus, for example, expansion memory 774 may be provided as a security module for mobile computing device 750, and may be programmed with instructions that permit secure use of mobile computing device 750. In addition, secure applications may be provided via the SIMM cards, along with additional information, such as placing identifying information on the SIMM card in a non-hackable manner.

Expansion memory 774 may include, for example, flash memory and/or NVRAM memory. In some implementations, a computer program product is tangibly embodied in an information carrier. The computer program product contains instructions that, when executed, perform one or more methods, such as those described above. The information carrier is a computer-or machine-readable medium, such as memory 764, expansion memory 774, or a memory on processor 752, that may be received, for example, over transceiver 768 or external interface 762.

Mobile computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768. In addition, short-range communication may occur, such as using a Bluetooth, WiFi, or other such transceiver. In addition, a Global Positioning System, also referred to as "GPS," receiver module 770 may provide additional navigation- and location-related wireless data to mobile computing device 750, which may be used as appropriate by applications running on mobile computing device 750.

Mobile computing device 750 may also communicate audibly using audio codec 760, which may receive spoken information from a user and convert the received spoken information to digital information. Audio codec 760 may likewise generate audible sound for a user, such as through a speaker, e.g., in a handset of mobile computing device 750. Such sound may include sound from voice telephone calls, may include recorded sound, e.g., voice messages, music files, etc., and may also include sound generated by applications operating on mobile computing device 750.

Mobile computing device 750 may be implemented in a number of different forms, as shown in the figure. For example, mobile computing device 750 may be implemented as a cellular telephone 780. Mobile computing device 750 may also be implemented as part of a smart phone 782, personal digital assistant, or other similar mobile device.

Various implementations of the systems and techniques described herein can be realized in digital electronic circuitry, integrated circuitry, specially designed application specific integrated circuits, computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, e.g., magnetic discs, optical disks, memory, Programmable Logic Devices, used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube or liquid crystal display monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback. Also, input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with some implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

The foregoing description provides illustration and description, but is not intended to be exhaustive or to limit the implementations to the precise form disclosed. Modifications and variations are possible in light of the above teachings or may be acquired from practice of the implementations.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the articles "a" and "an" are intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   obtaining metadata associated with a particular resource that is associated with a collection of private resources;
   determining that the metadata includes a particular type of metadata that reflects that access to one or more portions of the particular resource is restricted to one or more particular users;
   in response to determining that the metadata includes the particular type of metadata that reflects that access to the one or more portions of the particular resource is restricted to the one or more particular users, generating a restrict indicator, for each of the one or more portions of the particular resource, that identifies (i) the one or more particular users, and (ii) the portion of the particular resource to which access is restricted, wherein each portion of the particular resource comprises less than the entire resource;

storing, in a private search index and in association with the particular resource, (i) the metadata associated with the particular resource, and (ii) each of the generated restrict indicators, wherein each restrict indicator identifies the one or more particular users, and a particular portion of the one or more portions of the particular resource to which access is restricted, wherein each portion of the particular resource comprises less than the entire resource; and using at least one of the restrict indicators to determine whether to obfuscate a portion of the particular resource when the particular resource is provided in response to a subsequently received search query.

2. The method of claim 1, the method further comprising:
receiving a search query from a user;
identifying the particular resource as a search result that is responsive to the received search query from the user based at least on processing the received search query from the user against the private search index;
determining, based on the restrict indicator, that the user that submitted the search query is restricted from accessing a first portion of the particular resource;
obfuscating the first portion of the particular resource; and
providing an obfuscated version of the particular resource to the user.

3. The method of claim 1, wherein the metadata indicates that at least two or more portions of the particular resource are marked private for a single user.

4. The method of claim 1, wherein the metadata indicates that at least two or more portions of the particular resource are marked private for different users.

5. The method of claim 4, wherein the metadata further indicates that a first portion of the particular resource is marked private for a first user, and a second portion of the particular resource that is different than the first portion of the particular resource is marked private for a second user.

6. The method of claim 5, the method further comprising:
receiving a search query from the first user;
identifying the particular resource as a search result that is responsive to the received search query from the first user based at least on processing the received search query from the first user against the private search index;
obfuscating the second portion of the particular resource; and
providing an obfuscated version of the particular resource to the first user.

7. The method of claim 5, the method further comprising:
receiving a search query from the second user;
identifying the particular resource as a search result that is responsive to the received search query from the second user based at least on processing the received search query from the second user against the private search index;
obfuscating the first portion of the particular resource; and
providing an obfuscated version of the particular resource to the second user.

8. A system comprising:
one or more processors and one or more non-transitory computer storage media storing instructions that are operable, when executed by the one or more processors, to cause the one or more processors to perform operations comprising:
obtaining metadata associated with a particular resource that is associated with a collection of private resources;
determining that the metadata includes a particular type of metadata that reflects that access to one or more portions of the particular resource is restricted to one or more particular users;
in response to determining that the metadata includes the particular type of metadata that reflects that access to the one or more portions of the particular resource is restricted to the one or more particular users, generating a restrict indicator, for each of the one or more portions of the particular resource, that identifies (i) the one or more particular users, and (ii) the portion of the particular resource to which access is restricted, wherein each portion of the particular resource comprises less than the entire resource;
storing, in a private search index and in association with the particular resource, (i) the metadata associated with the particular resource, and (ii) each of the generated restrict indicators, wherein each restrict indicator identifies the one or more particular users, and a particular portion of the one or more portions of the particular resource to which access is restricted, wherein each portion of the particular resource comprises less than the entire resource; and
using at least one of the restrict indicators to determine whether to obfuscate a portion of the particular resource when the particular resource is provided in response to a subsequently received search query.

9. The system of claim 8, the operations further comprising:
receiving a search query from a user;
identifying the particular resource as a search result that is responsive to the received search query from the user based at least on processing the received search query from the user against the private search index;
determining, based on the restrict indicator, that the user that submitted the search query is restricted from accessing a first portion of the particular resource;
obfuscating the first portion of the particular resource; and
providing an obfuscated version of the particular resource to the user.

10. The system of claim 8, wherein the metadata indicates that at least two or more portions of the particular resource are marked private for a single user.

11. The system of claim 8, wherein the metadata indicates that at least two or more portions of the particular resource are marked private for different users.

12. The system of claim 11, wherein the metadata further indicates that a first portion of the particular resource is marked private for a first user, and a second portion of the particular resource that is different than the first portion of the particular resource is marked private for a second user.

13. The system of claim 12, the operations further comprising:
receiving a search query from the first user;
identifying the particular resource as a search result that is responsive to the received search query from the first user based at least on processing the received search query from the first user against the private search index;
obfuscating the second portion of the particular resource; and providing an obfuscated version of the particular resource to the first user.

14. The system of claim 12, the operations further comprising:
   receiving a search query from the second user;
   identifying the particular resource as a search result that is responsive to the received search query from the second user based at least on processing the received search query from the second user against the private search index;
   obfuscating the first portion of the particular resource; and
   providing an obfuscated version of the particular resource to the second user.

15. A non-transitory computer-readable medium having stored thereon instructions, which, when executed by one or more computers, cause the one or more computers to perform operations of:
   obtaining metadata associated with a particular resource that is associated with a collection of private resources;
   determining that the metadata includes a particular type of metadata that reflects that access to one or more portions of the particular resource is restricted to one or more particular users;
   in response to determining that the metadata includes the particular type of metadata that reflects that access to the one or more portions of the particular resource is restricted to the one or more particular users, generating a restrict indicator, for each of the one or more portions of the particular resource, that identifies (i) the one or more particular users, and (ii) the portion of the particular resource to which access is restricted, wherein each portion of the particular resource comprises less than the entire resource;
   storing, in a private search index and in association with the particular resource, (i) the metadata associated with the particular resource, and (ii) each of the generated restrict indicators, wherein each restrict indicator identifies the one or more particular users, and a particular portion of the one or more portions of the particular resource to which access is restricted, wherein each portion of the particular resource comprises less than the entire resource; and
   using at least one of the restrict indicators to determine whether to obfuscate a portion of the particular resource when the particular resource is provided in response to a subsequently received search query.

16. The computer-readable medium of claim 15, the operations further comprising:
   receiving a search query from a user;
   identifying the particular resource as a search result that is responsive to the received search query from the user based at least on processing the received search query from the user against the private search index;
   determining, based on the restrict indicator, that the user that submitted the search query is restricted from accessing a first portion of the particular resource;
   obfuscating the first portion of the particular resource; and
   providing an obfuscated version of the particular resource to the user.

17. The computer-readable medium of claim 15, wherein the metadata indicates that at least two or more portions of the particular resource are marked private for different users.

18. The computer-readable medium of claim 17, wherein the metadata further indicates that a first portion of the particular resource is marked private for a first user, and a second portion of the particular resource that is different than the first portion of the particular resource is marked private for a second user.

19. The computer-readable medium of claim 18, the operations further comprising:
   receiving a search query from the first user;
   identifying the particular resource as a search result that is responsive to the received search query from the first user based at least on processing the received search query from the first user against the private search index;
   obfuscating the second portion of the particular resource; and
   providing an obfuscated version of the particular resource to the first user.

20. The computer-readable medium of claim 18, the operations further comprising:
   receiving a search query from the second user;
   identifying the particular resource as a search result that is responsive to the received search query from the second user based at least on processing the received search query from the second user against the private search index;
   obfuscating the first portion of the particular resource; and
   providing an obfuscated version of the particular resource to the second user.

* * * * *

UNITED STATES PATENT AND TRADEMARK OFFICE
CERTIFICATE OF CORRECTION

PATENT NO. : 10,275,606 B2
APPLICATION NO. : 14/964681
DATED : April 30, 2019
INVENTOR(S) : Kulick et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 153 days.

Signed and Sealed this
Thirty-first Day of December, 2019

Andrei Iancu
*Director of the United States Patent and Trademark Office*